United States Patent
Klein et al.

(10) Patent No.: US 10,301,489 B2
(45) Date of Patent: May 28, 2019

(54) COMB POLYURETHANE DISPERSANTS

(71) Applicant: Huntsman Petrochemical LLC, The Woodlands, TX (US)

(72) Inventors: Howard P. Klein, Austin, TX (US); Frank Bertens, Everberg (BE); Petra Vanderstraeten, Everberg (BE); Jolande Celis, Everberg (BE)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 0 days.

(21) Appl. No.: 15/518,520

(22) PCT Filed: Nov. 5, 2015

(86) PCT No.: PCT/US2015/059236
§ 371 (c)(1),
(2) Date: Apr. 12, 2017

(87) PCT Pub. No.: WO2016/077147
PCT Pub. Date: May 19, 2016

(65) Prior Publication Data
US 2017/0240756 A1 Aug. 24, 2017

Related U.S. Application Data

(60) Provisional application No. 62/079,660, filed on Nov. 14, 2014.

(51) Int. Cl.
| | |
|---|---|
| *C08G 18/38* | (2006.01) |
| *C08G 18/50* | (2006.01) |
| *C08G 18/76* | (2006.01) |
| *C09D 11/102* | (2014.01) |
| *C09D 175/08* | (2006.01) |

(52) U.S. Cl.
CPC ........ *C09D 11/102* (2013.01); *C08G 18/3825* (2013.01); *C08G 18/5039* (2013.01); *C08G 18/7671* (2013.01); *C09D 175/08* (2013.01)

(58) Field of Classification Search
CPC ............ C08G 18/3825; C08G 18/7671; C08G 18/5039; C09D 11/102; C09D 175/08
See application file for complete search history.

(56) References Cited

U.S. PATENT DOCUMENTS

| | | |
|---|---|---|
| 4,915,860 A | 4/1990 | Kinoshita et al. |
| 5,852,123 A | 12/1998 | Huybrechts |
| 2008/0167423 A1 | 7/2008 | Richards et al. |
| 2010/0216932 A1 | 8/2010 | Richards et al. |
| 2010/0227950 A1 | 9/2010 | Nguyen et al. |
| 2011/0166316 A1 | 7/2011 | Duwenhorst et al. |
| 2014/0199524 A1 | 7/2014 | Rukavina |

FOREIGN PATENT DOCUMENTS

WO 2004104064 A2 12/2004

OTHER PUBLICATIONS

Kupryushkin, MS et al. "Efficient Functionalization of Oligonucleotides by New Achiral Nonnucleosidic Monomers" Organic Letters, vol. 16, May 12, 2014, pp. 2842-2845; p. 2842, scheme 1.

*Primary Examiner* — Patrick D Niland
(74) *Attorney, Agent, or Firm* — Huntsman Petrochemical LLC; Lewis Craft

(57) ABSTRACT

Embodiments described herein provide a dispersant for ink and pigmented coatings. The dispersant is a polyurethane having oxamide diol groups. The dispersant may be used to prepare a wide variety of inks and coatings having high pigment loading and existing within a conventionally-useful viscosity range.

9 Claims, No Drawings

COMB POLYURETHANE DISPERSANTS

FIELD

Embodiments described herein are generally related to non-aqueous and aqueous inks and pigmented coatings, and more specifically, to a comb polyurethane dispersant for inks and pigmented coatings.

BACKGROUND

When a pigment is used as a colorant, an ink composition is prepared by mixing the concentrated pigment dispersion which contains pigment, water, dispersant and the like with water, resin, a water-soluble organic medium, and other ingredients.

In ink compositions, the pigment dispersion is generally stabilized by a dispersant which serves to prevent the pigment particles from agglomerating and settling out of the carrier. While prior ink compositions showed acceptable stability for the pigment dispersion, improved pigment dispersion is still needed to further lower the ink viscosity, impart better print density, increase pigment loading, and lower milling times for ink and coating systems.

Therefore, an improved dispersant is needed.

SUMMARY

Embodiments described herein provide a dispersant for ink and pigmented coatings. An exemplary dispersant is a polyurethane including oxamide diol groups. Use of dispersants as taught herein enables the preparation of a wide variety of inks and coatings having high pigment loading and existing within a conventionally-useful viscosity range.

In one embodiment, the dispersant includes a polyurethane having oxamide diol groups.

In another embodiment, the dispersant includes a polyurethane formed by reacting a diisocyanate and an oxamide diol.

In another embodiment, a composition includes a pigment component, a dispersant including a polyurethane having oxamide diol groups.

DETAILED DESCRIPTION

For the purposes of this application, the weight average molecular weight is given by:

$$M_w = \frac{\sum_i n_i M_i^2}{\sum_i n_i M_i}$$

where ni is the number fraction of molecules of molecular weight Mi. Mw is typically determined by Gel Permeation Chromatography (GPC).

Embodiments described herein provide a dispersant for ink and pigmented coatings. In one embodiment, the dispersant is a comb polyurethane. An exemplary comb polyurethane is a polyurethane including oxamide diol groups. Use of dispersants as taught herein enables the preparation of a wide variety of inks and coatings having high pigment loading and existing within a conventionally-useful viscosity range.

A component of a liquid ink composition or a pigmented coating composition according to embodiments described herein is a comb polyurethane, made in accordance herewith, which serves to stabilize the pigment against agglomeration in the formulation.

A comb polyurethane suitable for use in an ink composition or a pigmented coating composition according to one embodiment is formed by reacting an oxamide diol with a diisocyanate. The product resulting from such a reaction may be a polyurethane having oxamide diol groups. The diisocyanate used for forming the polyurethane comb polymer may be any suitable diisocyanate. The diisocyanate may be aromatic, aliphatic, or cycloaliphatic. In one embodiment, an aromatic diisocyanate, such as methylene diphenyl diisocyanate (MDI), or modified MDI such as hydrogenated MDI, is used. Other suitable aromatic diisocyanates include p-phenylene diisocyanate, polymethylene polyphenylisocyanate, 2, 6-toluene diisocyanate, dianisidine diisocyanate, bitolylene diisocyanate, naphthalene 1,4-diisocyanate, bis(4-isocyanatophenyl)methane, bis(3-methyl-4-isocyanatophenypmethane, and 4,4'-diphenylpropane diisocyanate. Suitable aliphatic diisocyanates include hexamethylene diisocyanate (HDI), alkylene diisocyanate with 4 to 12 carbon atoms in the alkylene radical, such as 1, 12-dodecane diisocyanate or 1,4-tetramethylene diisocyanate, and bifunctional monomer of tetraalkyl xylene diisocyanate, such as tetramethyl xylene diisocyanate. Suitable cycloaliphatic diisocyanates include 1,3 and 1,4-cyclohexane diisocyanate as well as any mixture of these isomers, 1-isocyanato-3,3,5-trimethyl-5-isocyanatomethyl-cyclohexane (isophorone diisocyanate) as well as its isomers, 4,4'-2,2'- and 2,4'-dicyclohexylmethane diisocyanate as well as the corresponding isomer mixtures.

In one embodiment, the comb polyurethane is formed by reacting oxamide diol with a diisocyanate as shown below:

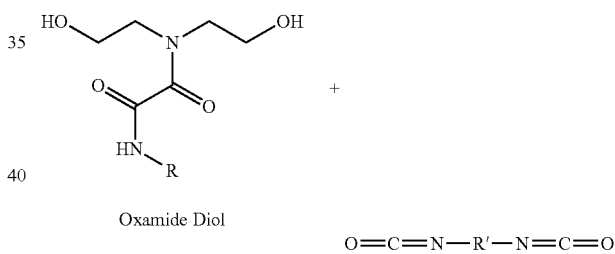

Oxamide Diol $$O=C=N-R'-N=C=O$$

where

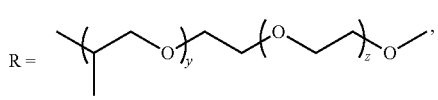

and y may be 5% to 95% of the sum of y and z, and z may be 5% to 95% of the sum of y and z. R' may be any suitable aromatic, aliphatic, or cycloaliphatic group. In one embodiment, R' is a biphenyl group and the diisocyanate is MDI. The product comb polyurethane has the following structure:

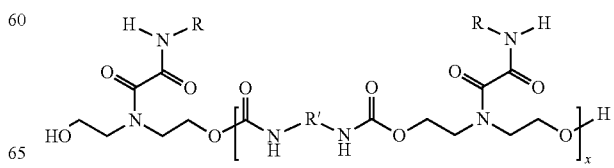

The terminal group may be the oxamide diol group, as shown above, or may be a hydroxide group.

In one embodiment, the comb polyurethane is formed by reacting oxamide diol with MDI as shown below:

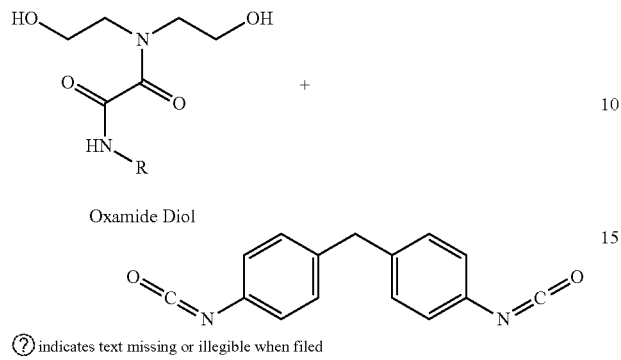

Oxamide Diol

⑦ indicates text missing or illegible when filed

The product comb polyurethane has the following structure:

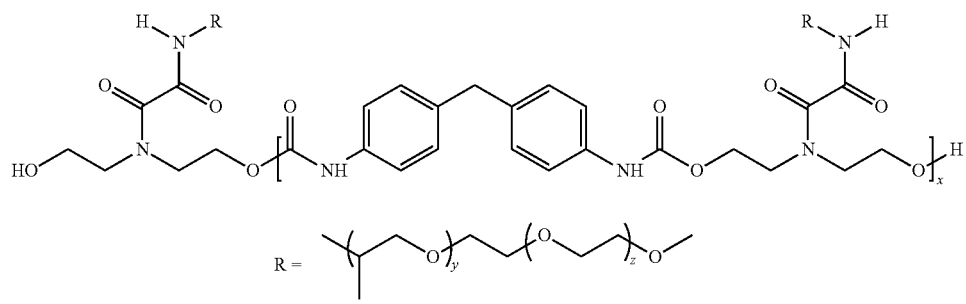

In one embodiment, the comb polyurethane from reacting oxamide diol and a diisocyanate has an average molecular weight ranging from about 13,000 to about 40,000, depending on the ratio of oxamide diol to the diisocyanate, and has neutral anchoring groups. In comparison, a conventional polymer dispersant may have an average molecular weight of around 5,000 and have basic anchoring groups. The comb polyurethane is very stable and highly effective in reducing the dispersion viscosity resulting in higher pigment loading and in reduced milling times for ink and coating compositions. The comb polyurethane may be soluble in water or in non-polar solvents. The comb polyurethane may have a backbone that is hydrophilic and pendant groups that are hydrophobic. Alternatively, the backbone is hydrophobic and the pendant groups are hydrophilic. The pendant group of the comb polyurethane may be oxamide, as shown above.

The oxamide diol may be synthesized by first forming a reactive six-member lactone, and then reacting the six-member lactone with a monofunctional, amine-terminated polyether, or a mono-polyetheramine. The six member lactone may be synthesized by condensation of a difunctional amino alcohol with diethyl oxalate as shown below:

where R2 is a hydrogen atom or an alkyl group having one to eight carbons. In one embodiment, the difunctional amino alcohol is diethanolamine (DEA) and the six member lactone is 4-hydroxyethyl-2,3-morpholinedione (HEMD), and the reaction is shown below:

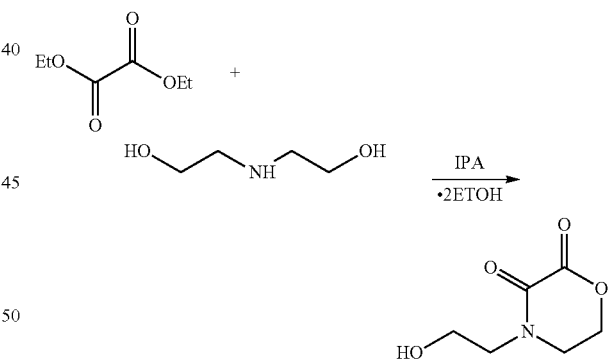

The six member lactone is then reacted with a mono-polyetheramine, such as Huntsman's SURFONAMINES amines, to form the oxamide diol. In one embodiment, HEMD is reacted with the mono-polyetheramine to form oxamide diol, as shown below:

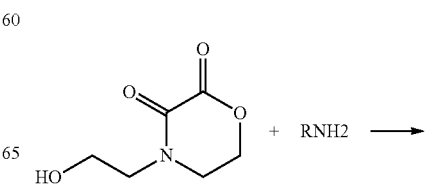

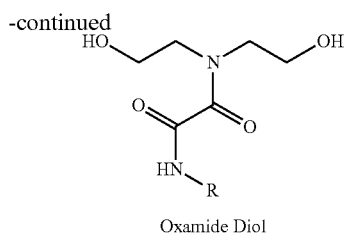

Oxamide Diol where R is prepared by addition of ethylene oxide (EO) and/or propylene oxide (PO) with an alcohol having various amount of carbon atoms. In some embodiments, a PO block is added at the end of the molecule bearing the amine group. As described above, R may have the following structure:

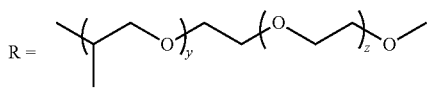

where y may be 5% to 95% of the sum of y and z, and z may be 5% to 95% of the sum of y and z. The conversion of the HEMD and amine to the oxamide diol may be at least 90%, such as from about 90% to about 95%.

The comb polyurethane component of the ink composition or the pigmented coating composition according to embodiments described herein may be provided in any amount between about 0.5% and about 25% by weight, such as between about 1% and about 10% by weight, based on the total weight of all pigment present in the ink composition or pigmented coating composition.

The pigment component may be an insoluble colorant material, such as phthalocyanine. However, a wide variety of organic and/or inorganic pigments may be present in an ink composition or a pigmented coating composition. Representative examples of inorganic pigments are carbon black, titanium oxides, chromates, sulfides, and iron oxides. Representative examples of organic pigments are azo pigments (such as azo lakes, insoluble azo pigment, condensed azo pigments, chelate azo pigments, monoazo pigments, including monoarylide, B-naphthol, naphthol AS, benzimidazolone, and metal precipitated azo, as well as disazo pigments, including diarylide, disazo condensation, diazopyrazoione, and bisacetoacetarylide), polycyclic pigments (such as phthalocyanine pigments, perylenes, perylene, and perinone pigments, anthraquinone pigments, quinacridone pigments, dioxazine pigments, thioindigo pigments, isoindolinone pigments, and quinophthalone pigments), lake pigments (such as base dye lakes, and acid dye lakes), nitro pigments, nitroso pigments, and aniline black daylight fluorescent pigments. Other representative pigments include isoindoline, isoindolinon, indigoid, diketopyrrolopyrrole, triarylcarbonium, metal complexes, pearl, liquid crystal pigments, fluorescence, and functional derivatives of the above-mentioned pigments. Additionally, suitable pigments include those that are dispersed in a water phase or those whose surfaces have been treated with a surfactant or a polymeric dispersing agent (such as graphite carbon).

The amount of pigments present in an ink composition or pigmented coating composition may vary and may be present in any amount ranging from about 1% to about 50%, alternatively from about 1% to about 40%, and in another embodiment, from about 2% to about 10% by weight, based on the total weight of ink or pigmented coating composition.

The ink composition or pigmented coating composition may include a solvent, which is sometimes referred to as the carrier medium. The carrier medium can be either aqueous or non-aqueous. When aqueous, the carrier medium may be water or may comprise a mixture of water and at least one organic solvent which is soluble in water. Exemplary water-soluble organic solvents include one or more polyhydric alcohols. Suitable polyhydric alcohols include ethylene glycol, propylene glycol, and diols such as butanediol, pentanediol. Glycols and glycol esters are also useful, and include those such as glycerol, propylene glycol laurate; polyalkyl glycols such as polyethylene glycol; and lower alkyl ethers of polyhydric alcohols, such as ethylene glycol monomethyl ether, ethylene glycol mono-ethyl ether and ethylene glycol mono-butyl ether.

Other suitable water-soluble organic solvents include lower alcohols and all their isomers having fewer than about eight carbon atoms per molecule such as methanol, ethanol, propanol, iso-propanol; ketones such as acetone; ethers such as dioxane; esters such as ethyl acetate, propyl acetate, and lactams such as 2-pyrrolidone.

Still further suitable solvents include aliphatics such as hexane and mineral spirits; aromatics such as toluene; triglycerides such as soy bean oil and castor oil; and fatty acids such as tall oil fatty acids.

The amount of solvent present in the ink composition or the pigmented coating composition may be any amount in the range of between about 10% to about 60%, such as from about 40% to about 55% based on total weight of the ink composition or the pigmented coating composition.

Pigments may be incorporated into a pigmented coating composition by mixing a pigment dispersion and a grind resin. The pigment dispersion may be a mixture of a pigment and a dispersant. Suitable grind resins typically include the polymerized residue of the styrene and/or substituted-styrene monomer and a carboxylated monomer. In one embodiment, the carboxylated monomer is selected from the group consisting of substituted or unsubstituted acrylic acid, methacrylic acid, maleic acid, half esters of maleic acid, citriconic acid, itaconic acid, and combinations thereof. In an alternative embodiment, the grind resin and the pigment dispersion are the same. In this instance, an additional amount of pigment dispersion acts as a grind resin.

The pigment dispersion and the grind resin may be mixed using mills such as a ball mill, grind mill, continuous mill, or by any other means that effectively integrates the pigment dispersion into the grind resin. In general, the pigmented dispersion and grind resin are effectively integrated when the desired particle size of the pigment is achieved, the pigment is appropriately wetted by the grinding resin, and the pigment is uniformly dispersed throughout the grind resin.

In an embodiment, the grind resin is present in an amount from about 0.1% to about 40% by weight based on the pigment. In an alternative embodiment, the grind resin is present in an amount from about 1% to about 30% by weight based on the pigment. In a still further embodiment, the grind resin is present in an amount from about 2% to about 20% by weight based on the pigment. In an embodiment, the size of the pigment is less than or equal to about 1 micron after grinding, as measured by ultrasound technology using DT-1200, which is manufactured by Dispersion Technologies Company.

An ink or coating composition may be suitably prepared by combining the various components and mixing them in a blender to homogenize, and grinding them in a bead mill. In one embodiment, the blender may be an ordinary kitchen blender. Optionally, a surfactant may be added to wet the pigment and modify the surface tension of the ink to control penetration of the ink into the paper. Examples of suitable surfactants include nonionic, amphoteric, anionic, zwitterionic, and cationic surfactants, and those of ordinary skill in this art are aware of the surfactants employed in this field. Other additives such as binders (resins), biocides, humectants, chelating agents, viscosity modifiers, and defoamers may also be present in an ink composition according to embodiments described herein. Optionally, acrylic and non-acrylic polymers may be added to improve properties such as water fastness and smear resistance. These may be solvent based, emulsions, water soluble polymers, coalescing aids, anti-settling, thixotropes, or plasticizers.

The comb polyurethane may also act as a dispersant which may be used to prepare a pigment concentrate. The pigment concentrate may be utilized to prepare ink compositions and pigmented coatings. The pigment concentrate may include a pigment, a solvent, one or more additives (defoamer, wetting agent), and the comb polyurethane. Optionally, a grind resin may be included in the pigment concentrate. The amount of solvent in the pigment concentrate may range from about 20 to 70% by weight. The amount of the comb polyurethane acting as a dispersant in the pigment concentrate may range from about 5 to about 80% by weight. The amount of the comb polyurethane acting as a dispersant may be the active amount of dispersant based on the total amount of the pigment used, and may be expressed as a weight percentage. For example, 5 g of the comb polyurethane is added to a pigment concentration including 18 g of pigment, and the active amount of dispersant is 27.8% (5/18).

The following examples are provided as illustrative examples and shall not be construed as delimitive of the scope of the disclosure whatsoever.

In one embodiment, HEMD granules were added to a 250 ml flask. The flask was fitted with an overhead stirrer, thermometer probe, nitrogen inlet and condenser. Then SURFONAMINE® L207 (heated to 50 degrees C. in an oven) was added to the flask. The mixture was stirred and heated under nitrogen. When the mixture reached 85 degrees C., HEMD was completely dissolved and set temperature was increased. When the mixture reached 115 degrees C., the mixture was kept at this temperature for about 2 hours and stirred under nitrogen. Then, the product was cooled to room temperature. The final product, oxamide diol, is a clear colorless liquid at room temperature. Three experiments were run and the amount of reactants used are shown in Table 1 below:

TABLE 1

Compounds for Preparation of Oxamide Diol

| | HEMD Mass (g) | HEMD Mole | SURFONAMINE® Mass (g) | SURFONAMINE® Mole |
|---|---|---|---|---|
| Batch 1 | 15.0 | 0.094 | 188.70 | 0.094 |
| Batch 2 | 15.0 | 0.094 | 188.70 | 0.094 |
| Batch 3 | 37.5 | 0.236 | 471.75 | 0.236 |

To determine the conversion of the preparation of the oxamide diol, a nuclear magnetic resonance spectroscopy (NMR) study was done. The conversion can also be calculated from the percent of amine in the starting material, the SURFONAMINEO L207, which contains 0.68% amine, and in the final product oxamide diol. The percentages of amine in the three diols and the percent conversion of the reactions are shown in Table 2:

TABLE 2

Percent Amine and Conversion of the Reactions

| | Percent Amine | Percent Conversion of Reactions |
|---|---|---|
| Batch 1 | 0.03 | 95.6 |
| Batch 2 | 0.03 | 95.6 |
| Batch 3 | 0.07 | 89.7 |

The viscosity of the three batches was measured at 25 degrees C., as shown in Table 3:

TABLE 3

Viscosity of the Oxamide Diols

| | Viscosity (cps) |
|---|---|
| Batch 1 | 1050 |
| Batch 2 | 1135 |
| Batch 3 | 1145 |

These three batches of oxamide diols were used as intermediate products for synthesis of polyurethane dispersants, assuming a conversion of 90% for the diol.

The three batches of the oxamide diols were each reacted with MDI. Four ratios of diol/MDI were chosen: 1.05, 1.16, 1.25 and 1.50. Table 4 shows the samples that were prepared. No catalyst was used.

TABLE 4

Overview of the Polyurethane Dispersants That were Synthesized

| | Ratio of diol/MDI | Oxamide diol used |
|---|---|---|
| Sample 1 | 1.05 | Batch 2 |
| Sample 2 | 1.16 | Batch 1 |
| Sample 3 | 1.25 | Batch 3 |
| Sample 4 | 1.50 | Batch 3 |

Each batch of the oxamide diol was added to a 250 ml flask. The flask was fitted with an overhead stirrer, thermometer probe, nitrogen inlet and condenser. The diol was heated to 80 to 90 degrees Celsius. Then an amount of SUPRASEC® 1306 (heated to 50 degrees C.), based on the abovementioned ratio, was added to the flask. The mixture was stirred and heated under nitrogen. When the mixture reached 110 degrees C., the mixture was kept at this temperature for about 2 hours and stirred under nitrogen. Then, the product, comb polyurethane, was cooled to room temperature. The comb polyurethane dispersants are clear yellow liquids at room temperature. Table 5 shows the compounds used for preparation of comb polyurethane dispersants:

TABLE 5

Compounds for Preparation of Polyurethane Dispersants

| | Ratio diol/MDI | Mass diol (g) | Mass MDI (g) | Mole diol | Mole MDI |
|---|---|---|---|---|---|
| Sample 1 | 1.05 | 145 | 14.39 | 0.060 | 0.058 |
| Sample 2 | 1.16 | 145 | 13.00 | 0.060 | 0.052 |

TABLE 5-continued

Compounds for Preparation of Polyurethane Dispersants

| | Ratio diol/MDI | Mass diol (g) | Mass MDI (g) | Mole diol | Mole MDI |
|---|---|---|---|---|---|
| Sample 3 | 1.25 | 200 | 16.67 | 0.083 | 0.067 |
| Sample 4 | 1.50 | 200 | 13.89 | 0.083 | 0.056 |

Infrared analysis was done and none of the samples showed an isocyanate peak. This means that conversion is 100%. GPC analysis was done on the comb polyurethane dispersants. Four low resolution peaks can be distinguished. Table 6 gives an overview of the area percent and molecular weight of each peak and the average molecular weight of the dispersants:

TABLE 6

Molecular Weight Distribution of the Polyurethane Dispersants

| Ratio diol/MDI | | Peak # 1 Area % | Mw | Peak # 2 Area % | Mw | Peak # 3 Area % | Mw | Peak # 4 Area % | Mw | Average Molecular Weight |
|---|---|---|---|---|---|---|---|---|---|---|
| 1.05 | Sample 1 | 34.8 | 85689 | 45.0 | 16738 | 14.5 | 7536 | 5.6 | 3584 | 39930 |
| 1.16 | Sample 2 | 24.6 | 76247 | 47.9 | 16787 | 18.3 | 7566 | 9.2 | 3747 | 29710 |
| 1.25 | Sample 3 | 13.8 | 67285 | 55.2 | 16530 | 19.7 | 7661 | 10.1 | 3733 | 21209 |
| 1.50 | Sample 4 | 4.6 | 59668 | 46.5 | 15403 | 26.7 | 7748 | 22.2 | 3580 | 13048 |

While the foregoing is directed to embodiments of the present invention, other and further embodiments of the invention may be devised without departing from the basic scope thereof, and the scope thereof is determined by the claims that follow.

The invention claimed is:

1. A dispersant, comprising a polyurethane having a structure:

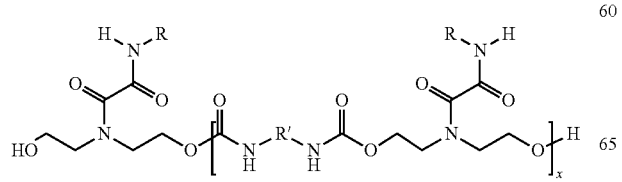

wherein

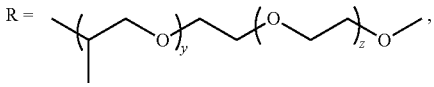

and y is 5% to 95% of a sum of y and z, and z is 5% to 95% of the sum of y and z, and wherein R' is an aromatic, aliphatic or cycloaliphatic group.

2. The dispersant of claim 1, wherein the polyurethane has a structure:

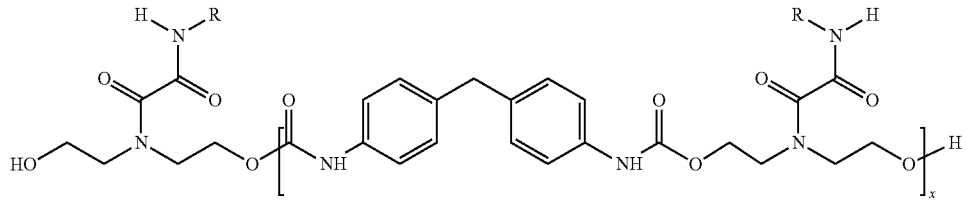

wherein

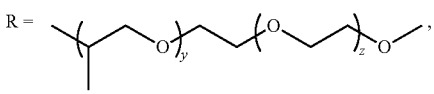

and wherein y is 5% to 95% of a sum of y and z, and z is 5% to 95% of the sum of y and z.

3. A dispersant, comprising a polyurethane formed by reacting a diisocyanate and an oxamide diol, wherein the polyurethane has a structure:

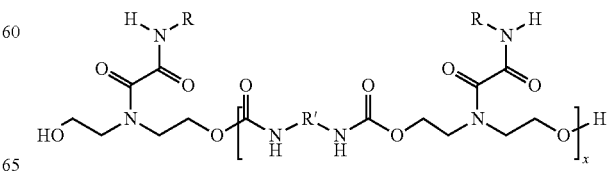

wherein

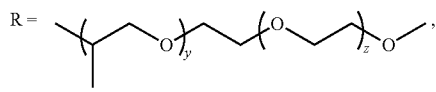

and y is 5% to 95% of a sum of y and z, and z is 5% to 95% of the sum of y and z, and wherein R' is an aromatic, aliphatic or cycloaliphatic group.

4. The dispersant of claim 3, wherein the diisocyanate is aromatic, aliphatic, or cycloaliphatic.

5. The dispersant of claim 4, wherein the diisocyanate is methylene diphenyl diisocyanate.

6. The dispersant of claim 3, wherein the polyurethane has a structure:

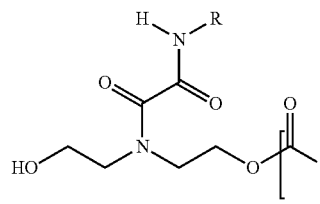

wherein

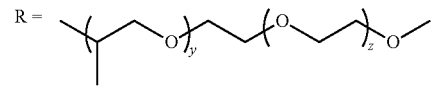

and wherein y is 5% to 95% of a sum of y and z, and z is 5% to 95% of the sum of y and z.

7. A composition, comprising:

a pigment component; and a dispersant including a polyurethane having a structure:

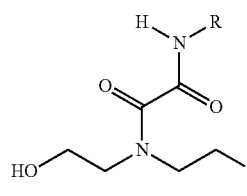

wherein

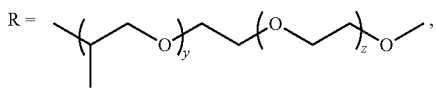

and y is 5% to 95% of a sum of y and z, and z is 5% to 95% of the sum of y and z, and wherein R' is an aromatic, aliphatic or cycloaliphatic group.

8. The composition of claim 7, wherein the pigment component is selected from the group consisting of phthalocyanine, carbon black, titanium oxides, chromates, sulfides, iron oxides, azo lakes, insoluble azo pigment, condensed azo pigments, chelate azo pigments, monoazo pigments, monoarylide, β-naphthol, naphthol AS, benzimidazolone, metal precipitated azo, disazo pigments, diarylide, disazo condensation, diazopyrazoione, bisacetoacetarylide, phthalocyanine pigments, perylenes, perylene, perinone pigments, anthraquinone pigments, quinacridone pigments, dioxazine pigments, thioindigo pigments, isoindolinone pigments, quinophthalone pigments, base dye lakes, acid dye lakes, nitro pigments, nitroso pigments, aniline black daylight fluorescent pigments, graphite carbon, isoindoline, isoindolinon, indigoid, diketopyrrolopyrrole, triarylcarbonium, metal complexes, pearl, liquid crystal pigments, fluorescence, functional derivatives thereof, and combination thereof.

9. The composition of claim 7, wherein the polyurethane has a structure:

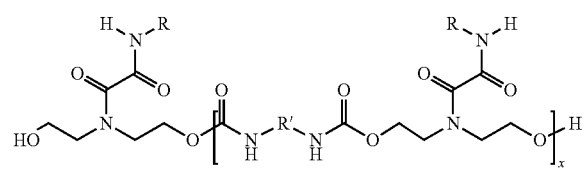

wherein

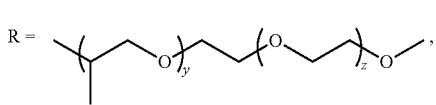

and wherein y is 5% to 95% of a sum of y and z, and z is 5% to 95% of the sum of y and z.

* * * * *